United States Patent [19]

Sorensen et al.

[11] Patent Number: 5,263,231

[45] Date of Patent: Nov. 23, 1993

[54] CABLE TIE WITH HOLLOW PAWL SECTIONS

[76] Inventors: Soren C. Sorensen, 12630 Carmel Country Rd., No. 110, San Diego, Calif. 92130; Jens O. Sorensen, P.O. Box 2274, Rancho Sante Fe, Calif. 92067

[21] Appl. No.: 836,496

[22] Filed: Feb. 18, 1992

Related U.S. Application Data

[63] Continuation-in-part of Ser. No. 747,732, Aug. 20, 1991.

[51] Int. Cl.$^5$ .............................................. B65D 63/00
[52] U.S. Cl. .............................. 24/16 PB; 24/17 AP
[58] Field of Search ........... 24/16 PB, 17 AP, 30.5 P; 248/74.3

[56] References Cited

U.S. PATENT DOCUMENTS

| | | | |
|---|---|---|---|
| 2,979,794 | 4/1961 | De Bartolo | 24/16 PB |
| 3,484,905 | 12/1969 | Eberhardt | 24/16 PB |
| 3,494,002 | 2/1970 | Kabel | 24/16 PB |
| 3,542,321 | 11/1970 | Kahabka | 24/16 PB |
| 3,735,449 | 5/1973 | Rosales | 24/16 PB |
| 3,739,429 | 6/1973 | Kohke | 24/16 PB |
| 3,855,669 | 12/1974 | Meyer | 24/16 PB |
| 3,924,299 | 12/1975 | McCormick | 24/16 PB |
| 3,965,538 | 6/1976 | Caveney et al. | 24/16 PB |
| 4,236,280 | 12/1980 | Kreiseder | 24/16 PB |
| 4,473,524 | 9/1984 | Paradis | 264/291 |
| 4,507,828 | 4/1985 | Furutsu | 24/16 PB |
| 4,573,242 | 3/1986 | Lankton et al. | 24/16 PB |
| 4,766,651 | 8/1988 | Kobayashi et al. | 24/16 PB |

FOREIGN PATENT DOCUMENTS

| | | | |
|---|---|---|---|
| 8300676 | 3/1983 | European Pat. Off. | 24/16 PB |
| 2528724 | 2/1976 | Fed. Rep. of Germany | 24/16 PB |
| 1127529 | 12/1956 | France | 24/16 PB |
| 1323198 | 7/1973 | United Kingdom | 24/16 PB |
| 2145150 | 3/1985 | United Kingdom | 24/16 PB |

OTHER PUBLICATIONS

Rosato, Dominick—editor, *Injection Molding Handbook*, 1986, pp. 148–154.
Frados, Joel—editor, *Plastics Engineering Handbook*, 1976, pp. 493–497.

*Primary Examiner*—Victor N. Sakran
*Attorney, Agent, or Firm*—Edward W. Callan

[57] ABSTRACT

In an injection molded cable tie that includes an elongated strap with an adjacent locking head at one end of the strap, a tip at the opposite end of the strap and ratchet teeth on one side of the strap, wherein the locking head defines an opening for allowing the tip end of the strap to be pulled through said opening and includes a pawl having teeth for engaging the ratchet teeth to lock the strap in the locking head after the tip end of the strap has been pulled through said opening, the pawl is thick enough so that when the strap is under normal tension in a locked position the pawl will not bend to such an extent that the pawl teeth lose engagement with the ratchet teeth and enable the strap to be at least partially released from its locked position, one side of the pawl includes the pawl teeth and the same side and/or the opposite side of the pawl includes at least one hollow section formed by the mold. When the cable tie is made by injection molding plastic material, the portion of the mold defining the hollow section of the pawl inhibits deformation of the surfaces of the pawl teeth that engage the ratchet teeth that might otherwise result from shrinkage of the injected plastic material in the mold cavity.

8 Claims, 1 Drawing Sheet

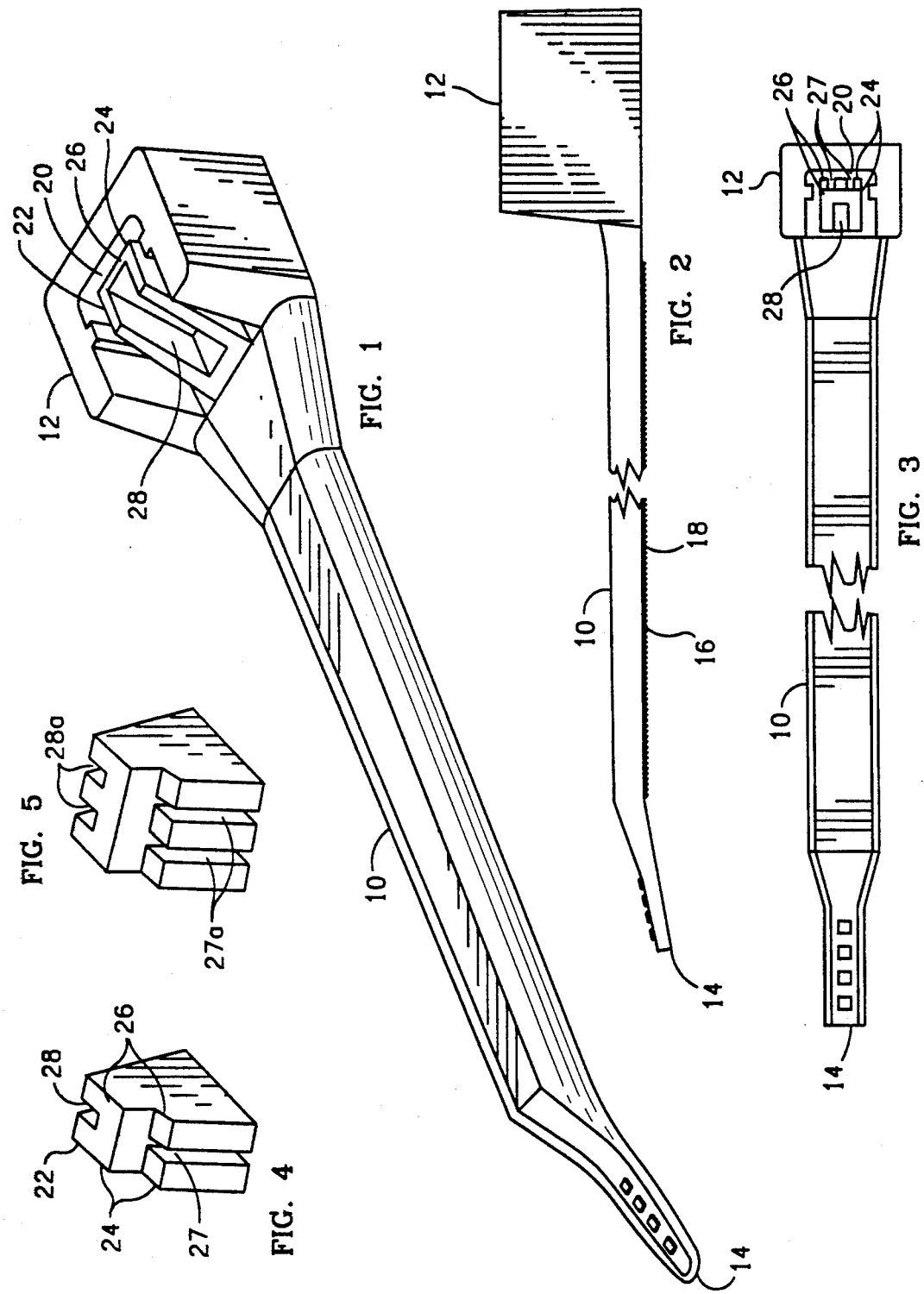

CABLE TIE WITH HOLLOW PAWL SECTIONS

CROSS-REFERENCE TO RELATED APPLICATION

This application is a continuation-in-part of application Ser. No. 07/747,732 filed Aug. 20, 1991.

BACKGROUND OF THE INVENTION

The present invention pertains to cable ties and the injection molding thereof with plastic material.

Cable ties are used to tie together a bundle of articles, such as cables.

A cable tie includes an elongated strap with an adjacent locking head at one end of the strap, a tip at the opposite end of the strap and ratchet teeth on one side of the strap. The locking head defines an opening for allowing the tip end of the strap to be pulled through the opening and thereby form a closed loop around a bundle of articles. The locking head further includes a pawl having teeth with surfaces for engaging the ratchet teeth to lock the strap in the locking head after the tip end of the strap has been pulled through said opening.

Cable ties are manufactured economically by an injection molding method, in which molten plastic material is injected into a mold cavity defining the cable tie and then allowed to solidify within the mold cavity.

It is desired that the pawl be thick so that it will be sufficiently strong that when the strap is under normal tension in a locked position the pawl will not bend to such an extent that the pawl teeth lose engagement with the ratchet teeth and enable the strap to be at least partially released from its locked position. However, when an injection molded cable tie having a thick pawl solidifies in the mold cavity, the surfaces of the pawl teeth that engage the ratchet teeth may become deformed through shrinkage in such a manner as to reduce the area of the surfaces of the pawl teeth that engage the ratchet teeth to lock the strap in the locking head.

SUMMARY OF THE INVENTION

The present invention provides an injection molded cable tie, comprising an elongated strap with an adjacent locking head at one end of the strap, a tip at the opposite end of the strap and ratchet teeth on one side of the strap; wherein the locking head defines an opening for allowing the tip end of the strap to be pulled through said opening and includes within the locking head a pawl having teeth for engaging the ratchet teeth to lock the strap in the locking head after the tip end of the strap has been pulled through said opening; wherein the pawl is thick enough so that when the strap is under normal tension in a locked position the pawl will not bend to such an extent that the pawl teeth lose engagement with the ratchet teeth and enable the strap to be at least partially released from its locked position; wherein one side of the pawl includes the pawl teeth and the same side and/or the opposite side of the pawl includes at least one hollow section formed by the mold and wherein the side of the pawl including the teeth converges toward the opposite side of the pawl in a direction in which the strap is pulled through the opening to lock the strap in the locking head.

Additional features of the present invention are described in relation to the description of the preferred embodiment.

BRIEF DESCRIPTION OF THE DRAWING

FIG. 1 is a perspective view of a preferred embodiment of a cable tie according to the present invention.

FIG. 2 is a side view of the cable tie of FIG. 1.

FIG. 3 is a top view of the cable tie of FIG. 1.

FIG. 4 is a perspective view of the pawl of the cable tie of FIG. 1.

FIG. 5 is a perspective view of an alternative preferred embodiment of the pawl.

The figures of the Drawing are not drawn to proportionate scale.

DESCRIPTION OF THE PREFERRED EMBODIMENTS

Referring to FIGS. 1-4, a preferred embodiment of a cable tie according to the present invention includes an elongated strap 10 with an adjacent locking head 12 at one end of the strap, a tip at the opposite end 14 of the strap and ratchet teeth 16 on one side 18 of the strap. The locking head 12 defines an opening 20 for allowing the tip end 14 of the strap to be pulled through the opening 20 and thereby form a closed loop around a bundle of articles (not shown). The locking head 12 further includes a pawl 22 having teeth 24 with surfaces 26 for engaging the ratchet teeth 16 to lock the strap 10 in the locking head 12 after the tip end 14 of the strap has been pulled through the opening 20.

The pawl 22 is thick enough so that when the strap 10 is under normal tension in a locked position the pawl 22 will not bend to such an extent that the pawl teeth 24 lose engagement with the ratchet teeth 16 and enable the strap to be at least partially released from its locked position.

One side of the pawl includes the pawl teeth 24. The side of the pawl 22 including the pawl teeth 24 includes at least one hollow section 27 in at least one of the pawl teeth 24; and the opposite side of the pawl 22 includes at least one hollow section 28. The hollow section 28 is a slot that extends in the direction in which the strap 10 is pulled through the opening 20 to lock the strap 10 in the locking head 12. The slot 28 penetrates a surface of at least one of the pawl teeth 24 that engage the ratchet teeth 16 and is exposed at the side of the pawl 22 that engages the ratchet teeth 16.

If the pawl is particularly wide, the pawl 22a may include a plurality of hollow sections 27a on the side of the pawl including the pawl teeth 24a; and the opposite side of the pawl 22a may include a plurality of hollow sections 28a, as shown in FIG. 5.

In other embodiments, there is at least one hollow section on only the one side or the opposite side of the pawl.

The method of injection molding a cable tie according to the present invention includes the steps of (a) providing a mold cavity defining a cable tie as described above, (b) injecting molten plastic material into the mold cavity to form the cable tie; and (c) allowing the injected plastic material to solidify, whereby the plastic material shrinks within the mold cavity. The portions of the mold defining the hollow sections 27, 28 of the pawl 22 inhibit any deformation of the surfaces 26 of the pawl teeth 24 that engage the ratchet teeth 16 that might otherwise result from shrinkage of the injected plastic material in the mold cavity while the cable tie is solidifying.

As may be seen in the Drawing, in the pawl 22 defined by the mold cavity the side of the pawl including the teeth 24 converges toward the opposite side of the pawl including the hollow section 28 in a direction in which the strap 10 is pulled through the opening 20 to lock the strap in the locking head 12. The method of injection molding a cable tie according to the present invention further includes the steps of (d) opening the mold; and (e) removing the solidified cable tie from the opened mold.

I claim:

1. An injection molded cable tie, comprising
an elongated strap with an adjacent locking head at one end of the strap, a tip at the opposite end of the strap and ratchet teeth on one side of the strap;
wherein the locking head defines an opening for allowing the tip end of the strap to be pulled through said opening and includes within the locking head a pawl having teeth for engaging the ratchet teeth to lock the strap in the locking head after the tip end of the strap has been pulled through said opening;
wherein the pawl is thick enough so that when the strap is under normal tension in a locked position the pawl will not bend to such an extent that the pawl teeth lose engagement with the ratchet teeth and enable the strap to be at least partially released from its locked position;
wherein one side of the pawl includes the pawl teeth and the same side and/or the opposite side of the pawl includes at least one hollow section formed by the mold; and
wherein the side of the pawl including the teeth converges toward the opposite side of the pawl in a direction in which the strap is pulled through the opening to lock the strap in the locking head.

2. An injection molded cable tie according to claim 1, wherein a mold defining said at least one hollow section of said pawl inhibits any deformation of the surface of the pawl teeth that engage the ratchet teeth that might otherwise result from shrinkage of the injected plastic material while the cable tie is solidifying.

3. An injection molded cable tie according to claim 1, wherein said hollow section is a slot that extends in said direction in which the strap is pulled through the opening to lock the strap in the locking head, with said slot penetrating a surface of at least one of the pawl teeth that engage the ratchet teeth.

4. An injected molded cable tie according to claim 3, wherein said slot is exposed at said one side of the pawl.

5. An injection molded cable tie, comprising
an elongated strap with an adjacent locking head at one end of the strap, a tip at the opposite end of the strap and ratchet teeth on one side of the strap;
wherein the locking head defines an opening for allowing the tip end of the strap to be pulled through said opening and includes within the locking head a pawl having teeth for engaging the ratchet teeth to lock the strap in the locking head after the tip end of the strap has been pulled through said opening;
wherein the pawl is thick enough so that when the strap is under normal tension in a locked position the pawl will not bend to such an extent that the pawl teeth lose engagement with the ratchet teeth and enable the strap to be at least partially released from its locked position; and
wherein one side of the pawl includes the pawl teeth and each of said one side of the pawl and the opposite side of the pawl includes at least one hollow section formed by the mold.

6. An injection molded cable tie, comprising
an elongated strap with an adjacent locking head at one end of the strap, a tip at the opposite end of the strap and ratchet teeth on one side of the strap;
wherein the locking head defines an opening for allowing the tip end of the strap to be pulled through said opening and includes within the locking head a pawl having teeth for engaging the ratchet teeth to lock the strap in the locking head after the tip end of the strap has been pulled through said opening;
wherein the pawl is thick enough so that when the strap is under normal tension in a locked position the pawl will not bend to such an extent that the pawl teeth lose engagement with the ratchet teeth and enable the strap to be at least partially released from its locked position; and
wherein one side of the pawl includes the pawl teeth and at least one hollow section formed by the mold.

7. An injection molded cable tie according to claim 6, wherein said hollow section is a slot that extends in a direction in which the strap is pulled through the opening to lock the strap in the locking head, with said slot penetrating a surface of at least one of the pawl teeth that engage the ratchet teeth.

8. An injected molded cable tie according to claim 7, wherein said slot is exposed at said one side of the pawl.

* * * * *